United States Patent Office 3,639,668
Patented Feb. 1, 1972

3,639,668
N-(2,2,4,4-TETRAFLUORO-1,3-BENZODIOXANYL)-UREAS
Hans-Ulrich Alles, Leichlingen, Erich Klauke, Odenthal-Hahnenberg, Engelbert Kühle, Bergisch-Gladbach, Ludwig Eue, Cologne-Stammheim, and Helmuth Hack, Cologne-Buchheim, Germany, assignors to Farbenfabriken Bayer Aktiengesellschaft, Leverkusen, Germany
No Drawing. Filed Apr. 9, 1969, Ser. No. 814,815
Claims priority, application Germany, Apr. 19, 1968,
P 17 68 244.9
Int. Cl. C07d 15/08
U.S. Cl. 260—340.3        7 Claims

ABSTRACT OF THE DISCLOSURE

N - (2,2,4,4 - tetrafluoro - 1,3 - benzodioxanyl) - ureas, i.e. N - (2,2,4,4 - tetrafluoro - 1,3 - benzodioxan - 6 - yl)-N' - (optionally alkyl substituted) - N' - alkyl - ureas which possess herbicidal properties, and which may be produced by conventional methods.

The present invention relates to and has for its objects the provision for particular new N-(2,2,4,4-tetrafluoro-1,3-benzodioxanyl)-ureas, i.e. N-(2,2,4,4-tetrafluoro-1,3-benzodioxan-6-yl)-N' - (optionally substituted)-N'-alkyl-ureas which possess valuable, especially selective, herbicidal properties, active compositions in the form of mixtures of such compounds with solid and liquid dispersible carrier vehicles, and methods for producing such compounds and for using such compounds in a new way, especially for combating weeds, undesired plants, and the like, with other and further objects becoming apparent from a study of the within specification and accompanying examples.

It is already known that N-aryl-N'-alkyl-ureas can be used as herbicides. Thus, for example N-(3-trifluoromethyl-phenyl)-N',N'-dimethyl-urea (A) is used as a selective herbicide in practice (cf. U.S. Pat. 3,134,665).

It has now been found, in accordance with the present invention, that the particular new N-(2,2,4,4-tetrafluoro-1,3-benzodioxanyl)-ureas of the general formula

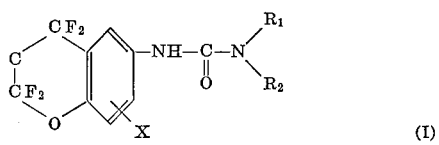

in which:

X is hydrogen,
R₁ is hydrogen or alkyl of 1–4 carbon atoms, and
R₂ is alkyl of 1–4 carbon atoms, exhibit strong herbicidal, in particular selective herbicidal, properties.

It has been furthermore found, in accordance with the present invention, that a process for the production of the particular new compounds of Formula I above may be provided, which comprises reacting an isocyanate of the formula

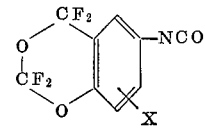

in which X is the same as defined above, with an amine of the formula $$\text{HN} \overset{R_1}{\underset{R_2}{-}}$$  (III)

in which R₁ and R₂ are the same as defined above, in the presence of a solvent.

It is most surprising that the ureas according to the present invention, while possessing about the same herbicidal activity as the known N-(3-trifluoromethyl-phenyl)-N',N'-dimethyl-urea (A), exhibit a higher selectivity towards agricultural cultivated plants.

When 6-isocyanato-2,2,4,4-tetrafluoro-1,3-benzodioxan and dimethylamine are used as starting reactants, the reaction course can be represented by the following reaction mechanism:

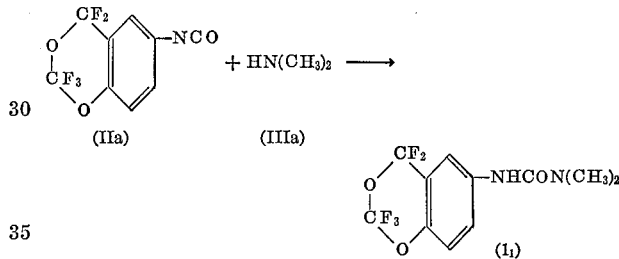

Advantageously, in accordance with the present invention, in the various formulae herein:

X represents hydrogen;
R₁ represents hydrogen; or
alkyl hydrocarbon of 1–4 carbon atoms such as methyl, ethyl, n- and iso-propyl, n-, iso-, sec- and tert.-butyl, and the like, especially C₁₋₂ alkyl, and more especially methyl; and
R₂ represents alkyl hydrocarbon of 1–4 carbon atoms such as methyl to tert.-butyl inclusive, and the like, as defined above, especially C₁₋₂ alkyl, and more especially methyl;
R₁ and R₂ being the same or different when both are alkyl.

In accordance with a particular feature of the present invention, N - (2,2,4,4-tetrafluoro-1,3-benzodioxan-6-yl)-N'-alkyl and N',N'-dialkyl ureas are contemplated of the formula

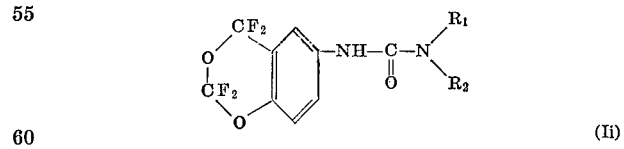

in which R₁ is hydrogen or C₁₋₄ or C₁₋₂ alkyl and R₂ is C₁₋₄ or C₁₋₂ alkyl, R₁ and R₂ preferably being the same when R₁ is also C₁₋₄ or C₁₋₂ alkyl.

The starting isocyanates of Formula II above have not previously been described, but can be prepared in simple manner as follows:

In the first step, a chloroformic acid 2-trichloromethylphenyl ester (which may be substituted optionally in the nucleus) is reacted with a 3- to 8-fold excess of anhydrous hydrofluoric acid at a temperature of from −10 to 20° C. in the presence of an inert organic solvent such as methylene chloride, and subsequently after-fluorinated under pressure at a temperature of from 20 to 100° C. The desired precursor 2,2,4,4 - tetrafluoro - 1,3 - benzodioxan (which correspondingly may be substituted optionally in the benzene nucleus) is thus obtained.

In the second step, the corresponding precursor benzodioxan is nitrated in the 6-position in the usual manner with acid.

In the third step, the corresponding 6-nitrobenzodioxan is converted by normal catalytic hydrogenation to give the appropriate aminobenzodioxan.

Finally, such 6-amino-benzodioxan is converted by treatment with phosgene, according to the usual processes, to the appropriate 6-isocyanato-benzodioxan (see also Example 1).

Examples of such starting isocyanates suitable for use in the production process of the present invention are: 6-isocyanato-, 6-isocyanato-7-chloro-, 6-isocyanato-7-trifluoromethyl-, 6-isocyanato-8-trifluoromethyl-, and the like,-2,2,4,4-tetrafluoro-1,3-benzodioxan.

The starting amines of Formula III above are known.

Examples of such starting amines suitable for use in the production process of the present invention are: mono and di-(same or different) methyl, ethyl, n- and iso-propyl, n-, iso-, sec.- and tert.-butyl, and the like, amines, such as methylamine, dimethylamine, methylethylamine, butylamine, methylbutylamine, and the like.

As solvent (the term solvent as used herein includes mere diluents) for the reaction, water and all inert organic solvents are suitable. Preferred solvents include ethers, such as dioxan; hydrocarbons, such as benzene and chlorobenzene; ketones, such as acetone; and the like.

The reaction temperatures can be varied within a fairly wide range. In general, the reaction is carried out at substantially between about 10–80° C., preferably at between about 20–40° C.

When carrying out the production process, approximately equimolar amounts of the starting reactants are used; but an excess of amine is not harmful. The reaction products are in most cases crystalline and can be readily isolated.

The instant active compounds exhibit a strong herbicidal potency and can therefore be used as weed killers. By weeds are meant in the essential sense all plants which grow in places where they are not desired. Whether the active compounds according to the present invention act as total or selective herbicidal agents depends on the magnitude of the amount applied, as the artisan will appreciate.

Advantageously, the active compounds according to the present invention can be used in the case of, for example, the following plants: dicotyledons, such as mustard (Sinapis), cress (Lepidium), cleaver (Galium), common chickweed (Stellaria), mayweed (Matricaria), smallflower Galinsoga (Galinsoga), fathen (Chenopodium), stinging nettle (Urtica), groundsel (Senecio), cotton (Gossypium), beets (Beta), carrots (Daucus), beans (Phaseolus), potatoes (Solanum), coffee (Coffea); monocotyledons, such as timothy (Phleum), bluegrass (Poa), fescue (Festuca), goosegrass (Eleusine), foxtail (Setaria), ryegrass (Lolium), cheat (Bromus), barnyard grass (Echinochloa), maize (Zea), rice (Oryza), oats (Avena), barley (Hordeum), wheat (Triticum), millet (Panicum), sugar cane (Saccharum); and the like.

The instant active compounds are preferably used as selective herbicides. Such active compounds exhibit a good selectivity when applied before emergence in cotton and also when applied after emergence in carrots.

The active compounds according to the instant invention can be utilized, if desired, in the form of the usual formulations or compositions with conventional inert pesticidal diluents or extenders, i.e. conventional pesticidal dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticidal dispersible liquid diluent carriers and/or dispersible solid carriers optionally with the use of carrier vehicle assistants, e.g. conventional pesticidal surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers including inert organic solvents, such as aromatic hydrocarbons (e.g. benzene, toluene, xylene, etc.), halogenated, especially chlorinated, aromatic hydrocarbons (e.g., chlorobenzenes), paraffins (e.g., petroleum fractions), chlorinated aliphatic hydrocarbons (e.g., methylene chloride, etc.), alcohols (e.g., methanol, ethanol, propanol, butanol, etc.), ethers, ether-alcohols (e.g. glycol monomethyl ether, etc.), amines (e.g., ethanol-amine, etc.), amides (e.g., dimethyl formamide, etc.), sulfoxides (e.g., dimethyl sulfoxide, etc.), ketones (e.g., acetone, etc.), and/or water; as well as inert dispersible finely divided solid carriers, such as ground natural minerals (e.g., kaolins, alumina, silica, chalk, i.e. calcium carbonate, talc, kieselguhr, etc.), and ground synthetic minerals (e.g., highly dispersed silicic acid, silicates, e.g. alkali silicates, etc.); whereas the following may be chiefly considered for use as conventional carrier vehicle assistants, e.g. surface-active agents, for this purpose: emulsifying agents, such as nonionic and/or anionic emulsifying agents (e.g., polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

As will be appreciated by the artisan, the active compounds according to the instant invention may be employed alone or in the form of mixtures with one another and/or with such solid and/or liquid dispersible carrier vehicles and/or with other known compatible active agents, especially plant protection agents, such as other herbicides, or fungicides, insecticides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1 and 95% by weight, and preferably 0.5 and 90% by weight, of the mixture, whereas carrier composition mixtures suitable for direct application or field application generally contemplate those in which the active compound is present in an amount substantially between about 0.005–0.5%, preferably 0.008–0.1%, by weight of the mixture. Thus, the present invention contemplates overall compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or dispersing agent, and an amount of the active compound which is effective for the purpose in question and which is generally between about 0.005–95%, and preferably 0.008–95%, by weight of the mixture.

In particular, the amount of active compound per unit area varies according to the purpose intended and the mode of application. In general, substantially between about 0.25–20 kg. of active compound per hectare are applied, preferably between about 0.5–10 kg. per hectare.

The active compounds can also be used in accordance with the well-known ultra-low-volume process with good success, i.e. by applying such compound if normally a liquid, or by applying a liquid composition containing the same, via very effective atomizing equipment in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

While the active compounds can be used according to the pre-emergence method, they are also particularly effective when used according to the post-emergence method.

Furthermore, the present invention contemplates methods of selectively killing, combating or controlling undesired plants, e.g. weeds and the like, which comprise applying to at least one of (a) such weeds and (b) their habitat, i.e. the locus to be protected, a herbicidally effective or toxic amount of the particular active compound of the invention alone or together with a carrier vehicle as noted above. The instant formulations or compositions are applied in the usual manner, for example by spraying, squirting, atomizing, scattering, dusting, watering, sprinkling, and the like, whether for pre-emergence application to the soil or post-emergence application to the weeds.

It will be realized, of course, that in connection with the pre-emergence use of the instant compounds as well as the post-emergence use thereof, the concentration of the particular active compound utilized in admixture with the carrier vehicle will depend upon the intended application and may be varied within a fairly wide range depending upon the weather conditions, the purpose for which the active compound is used, e.g. for total or only selective herbicidal effect, and the plants which are to be controlled or protected. Therefore, in special cases, it is possible to go above or below the aforementioned concentration ranges and/or amounts per unit area ranges.

The following examples illustrate, without limitation, the herbicidal activity of the particular active compounds of the present invention.

EXAMPLE 1

Pre-emergence test

Solvent: 5 parts by weight acetone
Emulsifier: 1 part by weight alkylaryl polyglycol ether To produce a suitable preparation of the particular active compound, 1 part by weight of such active compound is mixed with the stated amount of solvent. The stated amount of emulsifier is added thereto, and the resulting concentrate is then diluted with water to the desired final concentration.

Seeds of the test plants are sown in normal soil and, after 24 hours, watered with the given active compound preparation. It is expedient to keep constant the amount of water per unit area. The concentration of the given active compound in the preparation is of no importance, only the amount of active compound applied per unit area being decisive. After three weeks, the degree of damage to the test plants is determined and characterized by the values 0–5, which have the following meaning:

0—no effect
1—slight damage or delay in growth
2—marked damage or inhibition of growth
3—heavy damage and only deficient development or only 50% emerged
4—plants partially destroyed after germination or only 25% emerged
5—plants completely dead or not emerged.

The particular active compounds tested, the amounts applied and the results obtained can be seen from the following Table 1:

TABLE 1.—PRE-EMERGENCE TEST

| Active compound | Amount of active compound applied (kg./hectare) | Echinochloa | Chenopodium | Sinapis | Oats | Cotton | Wheat |
|---|---|---|---|---|---|---|---|
| (A) 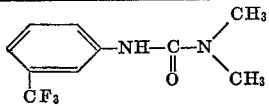 (known) | 10 | 5 | 5 | 5 | 5 | 4 | 5 |
|  | 5 | 5 | 5 | 5 | 5 | 2 | 5 |
|  | 2.5 | 5 | 5 | 5 | 5 | 1 | 5 |
|  | 1.25 | 5 | 5 | 5 | 5 | 0 | 4–5 |
| (1₂) 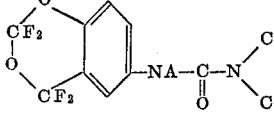 | 10 | 5 | 5 | 5 | 4 | 2 | 4 |
|  | 5 | 5 | 5 | 5 | 3 | 1 | 3 |
|  | 2.5 | 5 | 5 | 5 | 2 | 0 | 1 |
|  | 1.25 | 5 | 5 | 5 | 1 | 0 | 0 |

EXAMPLE 2

Post-emergence test

Solvent: 5 parts by weight acetone
Emulsifier: 1 part by weight alkylaryl polyglycol ether To produce a suitable preparation of the particular active compound, 1 part by weight of such active compound is mixed with the stated amount of solvent, the stated amount of emulsifier is added thereto, and the resulting concentrate is then diluted with water to the desired final concentration.

Test plants which have a height of about 5–15 cm. are sprayed with the given active compound preparation until just dew moist. After three weeks, the degree of damage to the plants is determined and characterized by the values 0–5, which have the following meaning:

0—no effect
1—a few slightly burnt spot
2—marked damage to leaves
3—some leaves and parts of stalks partially dead
4—plant partially destroyed
5—plant completely dead.

The particular active compounds tested, their concentrations and the results obtained can be seen from the following Table 2:

(2.59 mol) of 2,2,4,4-tetrafluoro-1,3-benzodioxan. The temperature of the reaction mixture is allowed to rise to 18° C. over about half an hour, then the mixture is dis-

TABLE 2.—POST-EMERGENCE TEST

| Active compound | Concentration of active compound (percent) | Echinochloa | Chenopodium | Sinapis | Galinsoga | Stellaria | Urtica | Oats | Cotton | Wheat | Carrots |
|---|---|---|---|---|---|---|---|---|---|---|---|
| (A) 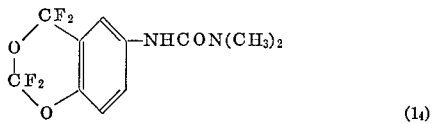 (known) | 0.1 | 5 | 5 | 5 | 5 | 5 | 5 | 5 | 4 | 2 | 5 |
|  | 0.05 | 5 | 5 | 5 | 5 | 5 | 5 | 3 | 3 | 2 | 5 |
|  | 0.025 | 5 | 5 | 5 | 5 | 5 | 4-5 | 2 | 2 | 1 | 4 |
|  | 0.0125 | 5 | 5 | 4-5 | 4 | 5 | 4 | 1 | 1-2 | 1 | 3 |
| (1₄) 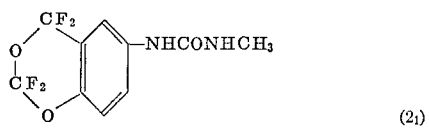 | 0.1 | 5 | 5 | 5 | 5 | 5 | 5 | 4-5 | 3-4 | 4-5 | 2 |
|  | 0.05 | 5 | 5 | 5 | 5 | 5 | 5 | 4 | 3 | 4 | 1 |
|  | 0.025 | 5 | 5 | 5 | 5 | 5 | 5 | 3 | 2 | 3 | 0 |
|  | 0.0125 | 5 | 5 | 5 | 4 | 5 | 5 | 2-3 | 1 | 2 | 0 |

EXAMPLE 3

(a)

$$\text{(structure)} \quad (1_4)$$

16 g. 6 - isocyanato - 2,2,4,4 - tetrafluoro - 1,3 - benzodioxan (M.P. 43 to 44° C.) dissolved in 50 ml. dioxan are added dropwise to a solution of 12 g. of a 50% aqueous solution of dimethylamine in 30 ml. dioxan and the temperature is allowed to rise to 30° C. After subsidence of the reaction, the reaction product is precipitated with water. After suction filtration and drying, 18 g. of 6-(N', N'-dimethyl - N - ureido) - 2,2,4,4 - tetrafluoro - 1,3-benzodioxan, i.e. N - (2,2,4,4 - tetrafluoro - 1,3 - benzodioxan-6-yl)-N',N'-dimethyl urea, of M.P. 112 to 114° C., are obtained.

(b) In analogous manner there is obtained $$\text{(structure)} \quad (2_1)$$

M.P. 149 to 151° C., i.e. 6 - (N' - methyl - N - ureido)-2,2,4,4 - tetrafluoro - 1,3 - benzodioxan or N - (2,2,4,4-tetrafluoro - 1,3 - benzodioxan - 6 - yl) - N' - methyl urea. Yield: 18 g.

(c) The isocyanate required for the reaction is obtained in the following manner:

(1) 2,2,4,4-tetrafluoro-1,3-benzodioxan

A solution of 200 g. chloroformic acid 2-(trichloromethyl)-phenyl ester in 100 ml. methylene chloride are added dropwise over a period of 2 hours, with stirring to 300 ml. of anhydrous hydrofluoric acid at 5° C. in a stainless steel vessel. The temperature is then allowed to rise slowly to 18° C. until evolution of hydrogen chloride has ceased. After distilling off the hydrofluoric acid and the solvent, fractionation is effected. 80.5 g. of distillate of boiling point 100° C./80 mm. Hg and 57.5 g. of distillate of boiling point up to 130° C./17 mm. Hg are obtained. From the lower boiling fraction, 73 g. of 2,2,4,4-tetrafluoro-1,3-benzodioxan of boiling point 155° C./760 mm. Hg and of refractive index $n_D^{20} = 1.4200$ can be obtained by alkaline steam distillation with the addition of 100 ml. of 20% NaOH and redistillation under normal pressure.

(2) 6-nitro-2,2,4,4-tetrafluoro-1,3-benzodioxan

To a mixture of 435 ml. H₂SO₄ (96% d.=1.84) and 390 ml. HNO₃ (98% d.=1.51) there are added dropwise at 0 to 2° C. over about 3 hours, with stirring, 540 g. charged into 2 litres of ice water. The crystalline precipitated solid product is filtered off with suction, washed well with water and recrystallized from methanol/water. Yield: 615 g. (93% of the theory) of 6-nitro-2,2,4,4-tetrafluoro-1,3-benzodioxan, M.P. 54 to 55° C.

(3) 6-amino-2,2,4,4-tetrafluoro-1,3-benzodioxan 200 g. (0.79 mol) of 6-nitro-tetrafluorobenzodioxan are hydrogenated in 800 ml. methanol in the presence of 35 g. of Raney nickel. After filtering off from the catalyst and distilling off the solvent, 180 g. of a crystallizing oil are obtained from which 145 g. (85% of the theory) of 6 - amino - 2,2,4,4 - tetrafluoro - 1,3 - benzodioxan of boiling point 110° C./13 mm. Hg and of melting point 34 to 36° C. are obtained by vacuum distillation.

(4) 6-isocyanato-2,2,4,4-tetrafluoro-1,3-benzodioxan

To a solution of 600 g. phosgene in 1300 ml. of dry chloro-benzene there is added dropwise at 0 to 5° C., with stirring, a solution of 390 g. (1.75 mols) of 6-amino-2,2,4,4 - tetrafluoro-1,3-benzodioxan in 1800 ml. of dry chlorobenzene. The suspension formed is slowly heated to 100° C., with further stirring, the solid product dissolving almost completely, with evolution of HCl. Phosgene is again introduced at 100° C. until a clear solution has formed. Purging with hot nitrogen is effected; the solvent is then distilled off in a vacuum and the residue (about 400 g.) is purified by distillation. The yield of pure 6-isocyanato-2,2,4,4-tetrafluoro - 1,3 - benzodioxan (B.P. 105° C./17 mm. Hg, M.P. 43 to 44° C.) is 355 g. (82% of the theory).

In analogous manner, the corresponding 6-isocyanato-2,2,4,4-tetrafluoro-1,3-benzodioxans, substituted in the nucleus by an appropriate 5-, 7- or 8-chloro, bromo, fluoro, iodo or trifluoromethyl group, can be prepared.

It will be realized by the artisan that all of the foregoing compounds contemplated by the present invention possess the desired selective or total herbicidal properties, and especially the capability of selectively destroying weeds, as well as a comparatively low toxicity toward warm-blooded creatures and a concomitantly low phytotoxicity with respect to higher plants, enabling such compounds to be used with correspondingly favorable compatibility with warm-blooded creatures and higher plants for more effective control and/or elimination of weeds by selective application of such compounds to such weeds and/or their habitat. Nevertheless, the instant compounds possess total herbicidal action when used in large quantities, although selective herbicidal action is obtained when used in smaller quantities. As contemplated herein, the term "weeds" is meant to include not only weeds in the narrow sense, but also in the broad sense, whereby to cover all plants and vegetation considered undesirable for the particular purposes in question.

It will be appreciated that the instant specification and examples are set forth by way of illustration and not limitation, and that various modifications and changes may be made without departing from the spirit and scope of the present invention.

What is claimed is:

1. N-(2,2,4,4-tetrafluoro-1,3-benzodioxanyl)-urea of the formula

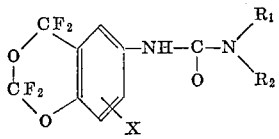

in which X is hydrogen, $R_1$ is selected from the group consisting of hydrogen and alkyl of 1–4 carbon atoms, and $R_2$ is alkyl of 1–4 carbon atoms.

2. Compound according to claim 1 wherein $R_1$ and $R_2$, each individually, is $C_{1-4}$ alkyl.

3. Compound according to claim 1 wherein $R_1$ and $R_2$ are the same $C_{1-4}$ alkyl.

4. Compound according to claim 1 wherein X is hydrogen, $R_1$ is selected from the group consisting of hydrogen and $C_{1-2}$ alkyl, and $R_2$ is $C_{1-2}$ alkyl.

5. Compound according to claim 1 wherein X is hydrogen, and $R_1$ and $R_2$, each individually, is $C_{1-2}$ alkyl.

6. Compound according to claim 1 wherein such compound is N-(2,2,4,4-tetrafluoro-1,3-benzodioxan-6-yl)-N'-methyl urea of the formula

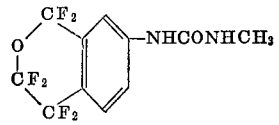

7. Compound according to claim 1 wherein such compound is N-(2,2,4,4-tetrafluoro-1,3-benzodioxan-6-yl)-N',N'-dimethyl urea of the formula

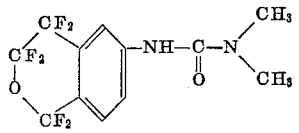

References Cited

"Chemical Abstracts," vol. 64 (1966), col. 16551a (Abstract of Netherland appl. 6,504,635, 1965).

NICHOLAS S. KIZZO, Primary Examiner

J. H. TURNIPSEED, Assistant Examiner

U.S. Cl. X.R.

424—278

UNITED STATES PATENT OFFICE
CERTIFICATE OF CORRECTION

Patent No. 3,639,668     Dated February 1, 1972

Inventor(s) Hans-Ulrich Alles, Erich Klauke, Engelbert Kuhle, Ludwig Eue, Helmuth Hack It is certified that error appears in the above-identified patent and that said Letters Patent are hereby corrected as shown below:

Col. 2, lines 29 and 35

In formulas:

"$CF_3$"     should be     --$CF_2$--

Col. 5, line 13

"particule"     should be     --particle--

Col. 8, Table 2    "Stellaria" column

Add --4-- as fourth figure in column

Signed and sealed this 15th day of August 1972.

(SEAL)
Attest:

EDWARD M. FLETCHER, JR.      ROBERT GOTTSCHALK
Attesting Officer              Commissioner of Patents